US005486139A

United States Patent [19]
Papp

[11] Patent Number: 5,486,139
[45] Date of Patent: Jan. 23, 1996

[54] EXTERIOR WINDSHIELD SURFACE BLOWER

[76] Inventor: George W. Papp, 537 Spring Lake Dr., Melbourne, Fla. 32940

[21] Appl. No.: 140,563

[22] Filed: Oct. 25, 1993

[51] Int. Cl.[6] .................................................. B60S 1/54
[52] U.S. Cl. ................................................ 454/123; 15/313
[58] Field of Search ............................. 454/123; 15/313

[56] References Cited

U.S. PATENT DOCUMENTS

| | | | |
|---|---|---|---|
| 1,591,182 | 7/1926 | Reaney | 454/123 |
| 1,717,904 | 6/1929 | Abernethy. | |
| 1,854,758 | 4/1932 | Noble. | |
| 1,861,333 | 5/1932 | Zuhlke et al. | 454/123 |
| 1,932,798 | 10/1933 | Millard. | |
| 2,032,998 | 3/1936 | Mickadeit. | |
| 2,187,281 | 1/1940 | Pagliaroni | 454/123 |
| 2,926,396 | 3/1960 | Hess. | |
| 3,014,251 | 12/1961 | Stern | 454/123 X |
| 3,769,898 | 11/1973 | Ide. | |
| 4,928,580 | 5/1990 | McIntyre et al. | 454/123 |

FOREIGN PATENT DOCUMENTS 12954  1/1989  Japan ........................................ 15/313

*Primary Examiner*—Harold Joyce
*Attorney, Agent, or Firm*—David L. Baker; Rhodes & Ascolillo

[57] ABSTRACT

In a preferred embodiment, an exterior windshield surface blower system to direct a flow of air at the windshield of a vehicle to remove rain and snow therefrom, the system including: an air deflector disposed along a lower edge of the exterior windshield surface and having a generally vertical face in proximity thereto, an air directing jets disposed in the face so as to direct forced air against the windshield, and an air supply arrangement to supply air to the air directing jets.

14 Claims, 3 Drawing Sheets

EXTERIOR WINDSHIELD SURFACE BLOWER

BACKGROUND OF THE INVENTION

1. Field of the Invention

The present invention relates to motor vehicles generally and, more particularly, but not by way of limitation, to a novel blower for removing rain and snow from the exterior surface of windshields on the motor vehicles.

2. Background Art

Motor vehicles having windshields typically employ oscillating elastomeric blade windshield wipers to remove rain and snow from the exterior surface of the windshields of the vehicles. Such blades can be annoying as they move back and forth across the windshield, and often the motion is not rapid enough to satisfactorily remove rain and snow. Snow and ice can accumulate on the blades, requiring the driver of a vehicle to periodically stop and manually clean the blades, which can create a safety hazard on the highway. The ice may also freeze the blades to the windshield when the vehicle is parked. Such blades also tend to smear the windshield, welding road tars and smudges against the glass. Additionally, they tend to grind dirt into the glass, causing scratches. Very perceptible and annoying sounds may emerge from the actuating mechanism as it reverses at the end of each stroke, creating squeaks as the blades cub against the glass. The blades must be changed periodically as the elastomeric material becomes hard, dry and brittle due to aging.

A number of attempts have been made to avoid the use of such conventional elastomeric blades.

U.S. Pat. No. 1,854,758, issued Apr. 19, 1932, to Noble, describes a windshield cleaner which directs hot air from the engine compartment against the exterior surface of a windshield. The hot air is gathered against a collecting deflector in the engine compartment which receives rearwardly flowing air as a result of the vehicle's forward motion. The air escapes through openings formed at the rear edges of the hood wings by the mounting of the device therein and external baffles direct the air against the windshield.

U.S. Pat. No. 1,932,798, issued Oct. 31, 1933, to Millard, describes various embodiments of arrangements for directing hot air at the exterior surface of a windshield, including the use of a blower and the injection of glycerin into the air stream.

U.S. Pat. No. 2,032,998, issued Mar. 3, 1936, to Mickadeit, describes a air-heated windshield in which air flows by convection into a coil wrapped around the exhaust manifold of a vehicle, then flows through control devices, and finally flows through perforated manifolds surrounding the windshield and across the windshield.

U.S. Pat. No. 2,926,396, issued Mar. 1, 1960, to Hess, describes a system for blowing heated air against a windshield in which heated air from a blower in the engine compartment is mixed with an air stream created by the forward motion of the vehicle.

U.S. Pat. No. 3,769,898, issued Nov. 6, 1973, to Ide, describes a system for blowing hot air across a windshield which includes blowers disposed in ducts behind the vehicle's radiator. The air is ducted to the lower edge of the windshield where it discharges against the windshield through slits.

Various disadvantages of the above devices are poor air flow, poor air distribution, and complexity. All of the above devices have upwardly open air outlets which gather fallen dirt, leaves and other debris.

Accordingly, it is a principal object of the present invention to provide an exterior windshield surface blower system which provides a high air flow.

It is a further object of the invention to provide such an exterior windshield surface blower system which provides good distribution of air.

It is an additional object of the invention to provide such an exterior windshield surface blower system into which dirt, leaves, and other debris cannot fall.

It is another object of the invention to provide such an exterior windshield surface blower system which is economical to construct and easily installed.

It is yet a further object of the invention to provide such an exterior windshield surface blower system which can be furnished as original equipment or can be easily retrofitted to an existing vehicle.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an exterior windshield surface blower system, disposed on a vehicle, to direct a flow of air at a windshield of the vehicle to remove rain and snow therefrom, said system comprising: an air deflector disposed along a lower edge of the exterior surface of the windshield and having a generally vertical face in proximity thereto, an air directing means disposed in said face so as to direct forced air against said windshield, and an air supply means to supply air to said air directing means.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
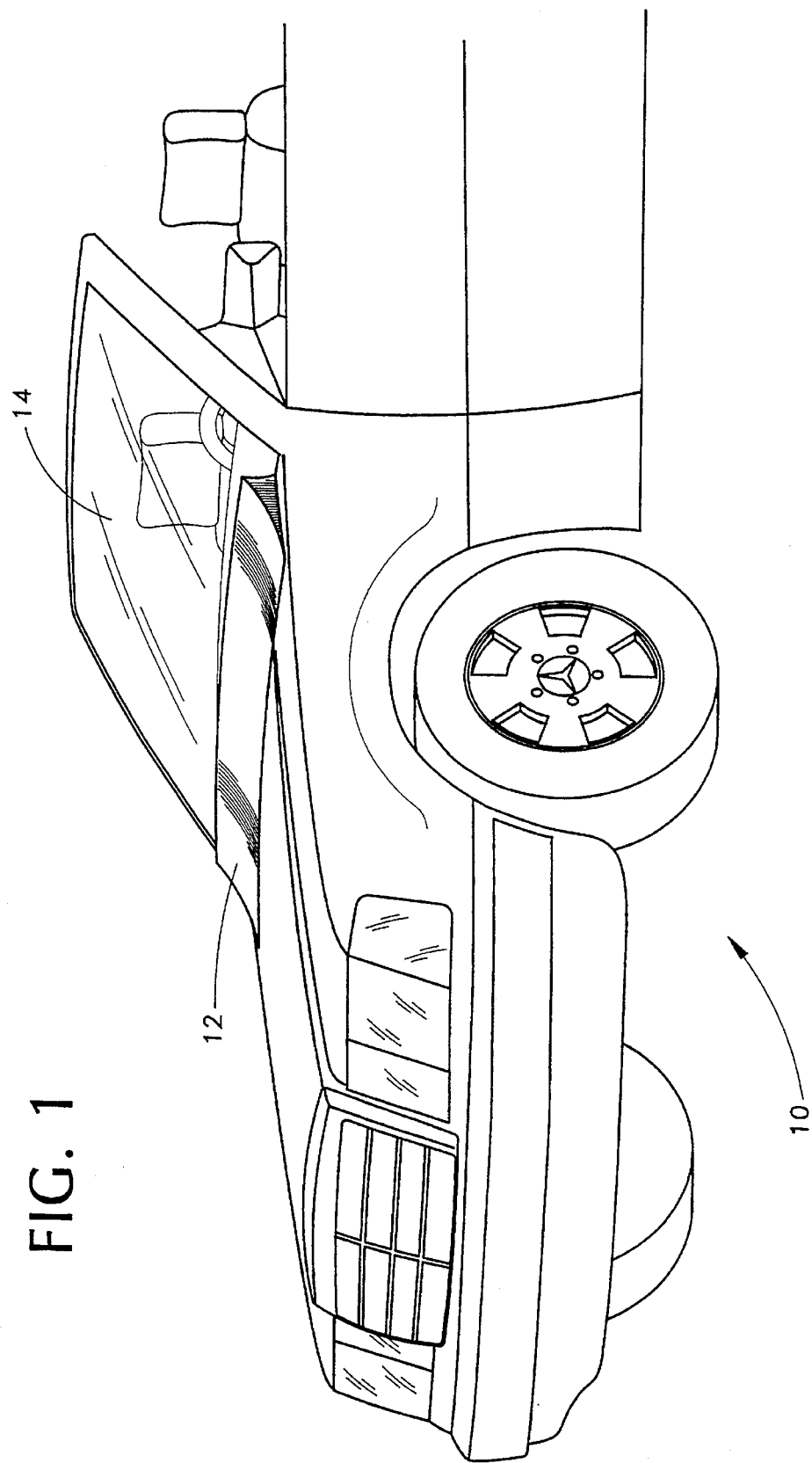
FIG. 1 is a fragmentary, perspective view of an automobile with the present invention installed thereon.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates an automobile, generally indicated by the reference numeral 10, on which an exterior windshield surface blower system according to the present invention is installed. The portion of the system visible on FIG. 1 is an air deflector 12 which is shown in position to cause streams of air to be directed against the exterior surface of a windshield 14 of the automobile 10.

Figure 2:
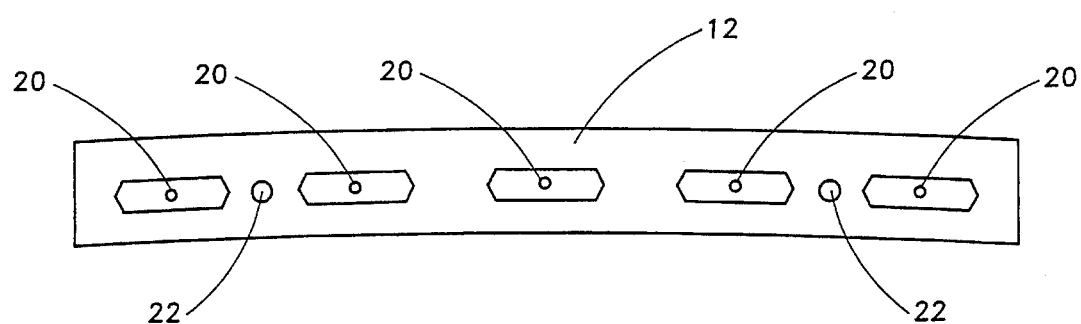
FIG. 2 is a front elevational view of the air discharging portion of the invention.

FIG. 2 illustrates the rice of air deflector 12 in which are disposed a plurality of fan spray jets 20 arranged so as to direct streams of air fully across windshield 14. Conventional windshield washer jets 22 may also be provided in the vertical face 54 of air deflector 12.

Figure 3:
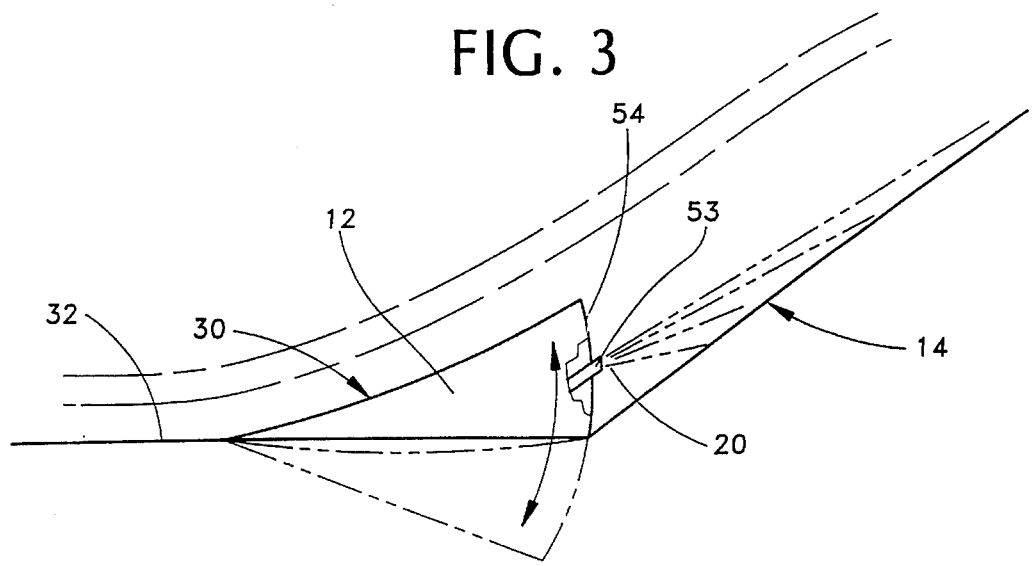
FIG. 3 is a fragmentary, side elevational view of the air discharging portion of the invention installed on an automobile.

As seen on FIG. 3, the distal ends of fan spray jets 20 have a vertically 53 surface of the distal end of the fan spray jets so that foreign materials cannot fall thereinto. The distal ends of fan spray jets 20 may also be cut back slightly downward and away from the exterior surface of the windshield 14 to further ensure the exclusion of foreign materials from entering the fan spray jets 20. As indicated by the dashed lines which simulate air flow streams, fan spray jets 20 are arranged so as to provide substantially full coverage of the exterior surface of windshield 14. Also as indicated on FIG. 3, when the air deflector 12 is not in use, the air deflector may be stored by being lowered into a cavity (not shown) provided in the hood 32 of the automobile 10, in the direction shown by the arrow, so that the upper surface 30 of the air deflector is essentially flush with the hood 32 of automobile 10. The lowering of air deflector 12 may be accomplished electrically or hydraulically at the push of a button (not shown). This further protects against the ingress of foreign materials into the system.

Figure 4:
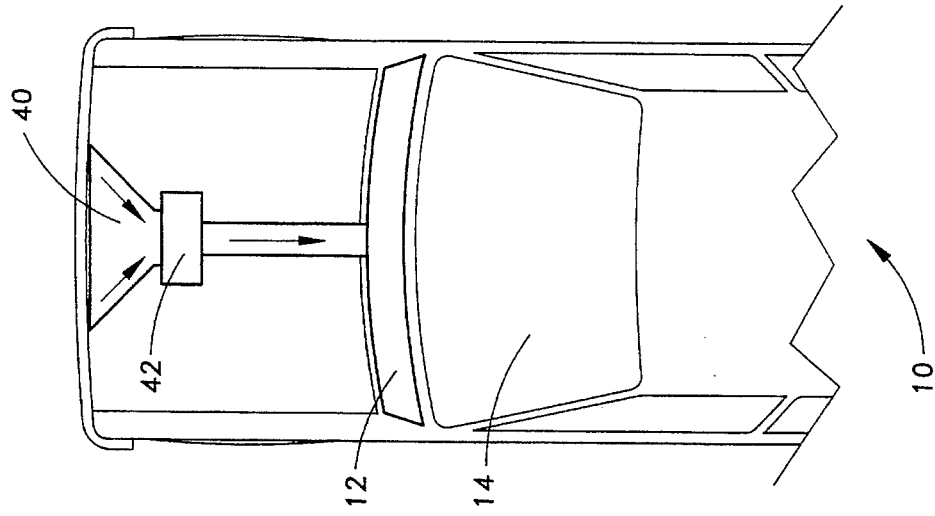
FIGS. 4–6 are fragmentary, cutaway views of the automobile of FIG. 1 illustrating alternative embodiments of means to supply pressurized air to a windshield.

FIG. 4 illustrates an embodiment of one air supply arrangement according to the present invention. Here, a funnel shaped, ram air collector 40 supplies air to the suction end of a blower 42. The blower 42 may be belt driven from the engine of automobile 10, or may be driven by its own separate electric motor. Blower 42 then supplies air to fan spray jets 20 (FIG. 3). Blower 42 may be a variable speed type blower, which can be adjusted to allow for various weather and driving conditions.

Figure 5:
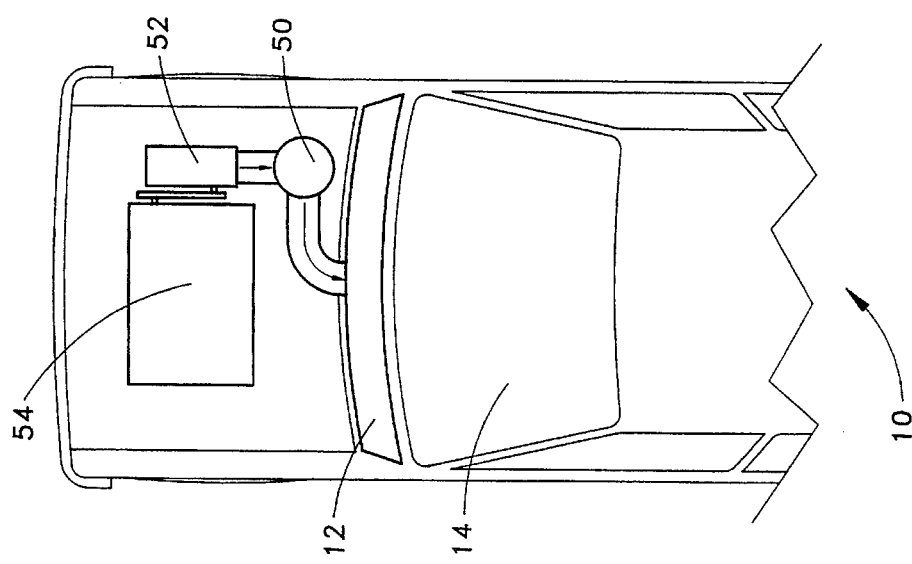
Figure 6:
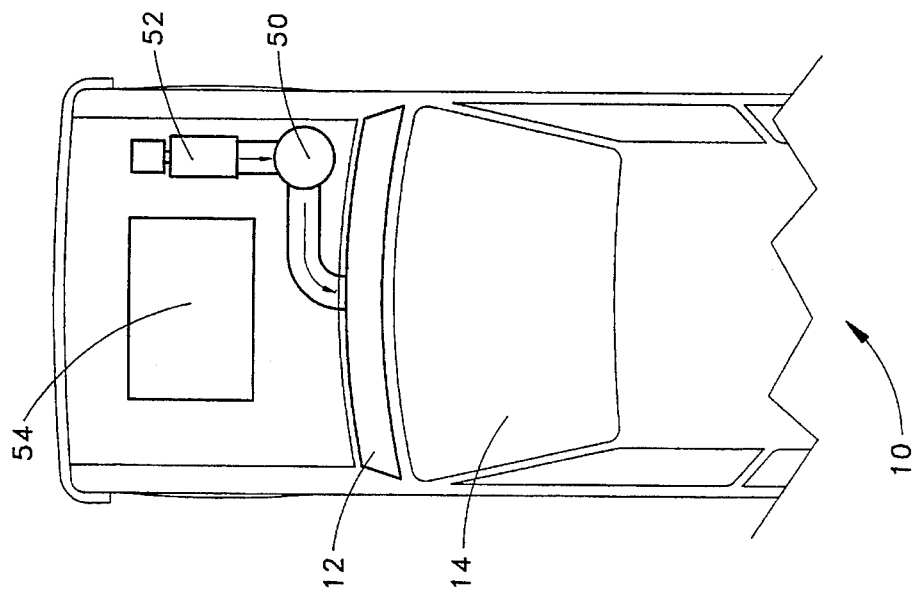

FIGS. 5 and 6 illustrate alternative embodiments of an air supply arrangement having a pressurized air reservoir tank 50 interposed between an air compressor 52 and air deflector 12. Air reservoir tank 50 provides a source of relatively highly pressurized air which can be controlled by means (not shown) to provide increased air flow when conditions so require. On FIG. 5, air compressor 52 is shown as being belt-driven from engine 54 of automobile 10, while on FIG. 6, air compressor 52 has its own electric motor. In the arrangement shown in FIG. 5, the pressure in air reservoir tank 52 may be controlled by using an electro-magnetic clutch (not shown) associated with air compressor 52. In the arrangement shown in FIG. 6, the pressure may be controlled by starting and stopping the air compressor 52 and/or by adjusting the speed of the variable speed motor for the air compressor 52.

The aerodynamic shape of upper surface 30 (FIG. 3) assists in keeping windshield 14 clean by directing a flow of air past the windshield and also tends to direct bugs, stones, cinders, road salt, and other debris over the windshield, as indicated on the trajectories above the upper surface 30 of the air deflector 12 shown in FIG. 3.

In another embodiment, a plurality of fan spray jets is disposed on the upper surface 30 of the air deflector 12.

The mechanical parts of the system of the present invention may be selected from available conventional components, and the system is economical to construct. Air deflector 12 should be fabricated from a polymeric material which will not rust.

The system of the present invention may be installed as original equipment when automobile 10 is manufactured, or the components can be installed on an existing vehicle with relatively minor revisions thereto.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An exterior windshield surface blower system, disposed on a vehicle, to direct a flow of air at a windshield of the vehicle to remove rain and snow therefrom, said system comprising:

(a) an air deflector disposed along a lower edge of said exterior windshield surface, having an upper surface and having a generally vertical face in proximity with the exterior windshield surface;

(b) an air directing means disposed in said face so as to direct forced air against said windshield;

(c) said air directing means comprises a plurality of fan spray jets; and (d) an air supply means to supply forced air to said air directing means.

2. An exterior windshield surface blower system, as defined in claim 1, wherein said upper surface of said air deflector is curved so as to direct a stream of air over and past said windshield as the vehicle moves in a forward direction.

3. An exterior windshield surface blower system, as defined in claim 1, wherein said air deflector is movable between (1) an open position in which said air directing means can direct air against said windshield and (2) a closed position in which the upper surface of said air deflector is substantially flush with a surface of a vehicle on which said air deflector is disposed.

4. An exterior windshield surface blower system, as defined in claim 1, further comprising at least one windshield washer jet disposed in said generally vertical face.

5. An exterior windshield surface blower system, as defined in claim 1, wherein said air supply means comprises:

(a) a pressurized air reservoir tank connected to said air directing means; and (b) compressing means o supply compressed air to said pressurized air reservoir tank.

6. An exterior windshield surface blower system, as defined in claim 5, wherein said compressing means comprises an air compressor driven by an engine in the vehicle on which said system is disposed.

7. An exterior windshield surface blower system, as defined in claim 5, wherein said compressing means comprises an air compressor driven by an electric motor.

8. An exterior windshield surface blower system, disposed in a vehicle, to direct a flow of air at a windshield of the vehicle to remove rain and snow therefrom, said system comprising:

(a) air directing means disposed so as to direct air against said windshield;

(b) a pressurized air reservoir tank connected to said air directing means;

(c) compressing means connected to said pressurized air reservoir tank to supply compressed air to said pressurized air reservoir tank; and (d) said air directing means comprises an air deflector having a face, a plurality of fin spray jets is disposed in said face, and having a curved upper surface arranged so as to direct a stream of air over and past said windshield as the vehicle moves in a forward direction.

9. An exterior windshield surface blower system, as defined in claim 8, wherein said compressing means comprises an air compressor driven by an engine in the vehicle on which said system is disposed.

10. An exterior windshield surface blower system, as defined in claim 8, wherein said compressing means comprises an air compressor driven by an electric motor.

11. An exterior windshield surface blower system, as defined in claim 8, wherein distal ends of said air directing means terminate flush with a generally vertical plane.

12. An exterior windshield surface blower system, as defined in claim 8, wherein said air directing means comprises a plurality of fan spray jets.

13. An exterior windshield surface blower system, as defined in claim 8, wherein said air deflector is movable between an open position in which said air directing means can direct air against said windshield and a closed position in which an upper surface of said air deflector is substantially flush with a surface of a vehicle on which said air deflector is disposed.

14. An exterior windshield surface blower system, as defined in claim 8, further comprising at least one windshield washer jet disposed in said face.

* * * * *